US012457456B2

(12) United States Patent
Zhou

(10) Patent No.: US 12,457,456 B2
(45) Date of Patent: *Oct. 28, 2025

(54) DUAL-CONE LOUDSPEAKER

(71) Applicant: SUZHOU SONAVOX ELECTRONICS CO., LTD., Suzhou (CN)

(72) Inventor: Jianming Zhou, Suzhou (CN)

( * ) Notice: Subject to any disclaimer, the term of this patent is extended or adjusted under 35 U.S.C. 154(b) by 332 days.

This patent is subject to a terminal disclaimer.

(21) Appl. No.: 18/024,271

(22) PCT Filed: Oct. 8, 2021

(86) PCT No.: PCT/CN2021/122623

§ 371 (c)(1),
(2) Date: Jun. 20, 2023

(87) PCT Pub. No.: WO2022/048691

PCT Pub. Date: Mar. 10, 2022

(65) Prior Publication Data

US 2024/0298116 A1 Sep. 5, 2024

(30) Foreign Application Priority Data

Sep. 2, 2020 (CN) ......................... 202021883998.1

(51) Int. Cl.

| | |
|---|---|
| ***H04R 9/06*** | (2006.01) |
| ***H04R 7/06*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............... *H04R 9/063* (2013.01); *H04R 7/06* (2013.01); *H04R 7/18* (2013.01); *H04R 9/025* (2013.01); *H04R 9/043* (2013.01); *H04R 2207/021* (2013.01); *H04R 2400/11* (2013.01)

(58) Field of Classification Search

CPC .... H04R 9/063; H04R 9/043; H04R 2207/02; H04R 7/18; H04R 7/06; H04R 2400/11

See application file for complete search history.

(56) References Cited

U.S. PATENT DOCUMENTS

2015/0271605 A1* 9/2015 Zhang .................... H04R 9/025
381/401

FOREIGN PATENT DOCUMENTS

CN 202127507 U * 1/2012
CN 202713594 U 1/2013
CN 212936188 U 4/2021

* cited by examiner

*Primary Examiner* — Sunita Joshi

(74) *Attorney, Agent, or Firm* — SOROKER AGMON NORDMAN

(57) ABSTRACT

Disclosed is a dual-cone loudspeaker, including: a frame; a cone assembly arranged on the frame and including a central cone and an outer cone; a central drive mechanism for driving the central cone to vibrate; and a plurality of outer driving mechanisms for driving the outer cone to vibrate. The outer driving mechanisms are arranged around the central drive mechanism. The central drive mechanism includes a central voice coil connected to the central cone, and a central magnetic driving system for driving the central voice coil. Each of the plurality of outer driving mechanisms comprises an outer voice coil connected to the outer cone, an outer damper sleeved on the outer voice coil, and an outer magnetic driving system for driving the outer voice coil.

13 Claims, 4 Drawing Sheets

DUAL-CONE LOUDSPEAKER

The present disclosure claims the priority from Chinese Patent Application No. CN2020218839981.

FIELD OF TECHNOLOGY

The present disclosure belongs to the field of loudspeaker, and relates to a dual-cone loudspeaker, and in particular to a dual-cone multi-channel audio input signal-driven loudspeaker.

BACKGROUND

The existing traditional loudspeaker generally uses a tapered cone with an edge ring to form a loudspeaker vibration system structure together with a damper and a voice coil. The centers of the tapered cone and the damper are provided with central holes. The damper is arranged below the tapered cone, makes the single-channel signal-input voice coil pass through the center holes of the damper and the tapered cone, combines the tapered cone and the damper on an outer wall of the voice coil, and closely combines the tapered cone and an outer edge of the damper with the frame to form the loudspeaker vibration system. This traditional loudspeaker can only be applied to single-channel signal inputting, which has limitations on sound reproduction. At present, although it is reported that multiple magnetic driving systems are used to drive multiple voice coils respectively, the sound reproduction clarity of the loudspeaker needs to be improved.

SUMMARY

The present disclosure relates to a dual-cone loudspeaker, which improves the sound reproduction clarity and has high sensitivity.

A dual-cone loudspeaker comprises a frame and a cone assembly arranged on the frame, the cone assembly comprises a central cone and an outer cone, the loudspeaker further comprises a central driving mechanism for driving the central cone to vibrate, and a plurality of outer driving mechanisms for driving the outer cone to vibrate, the outer driving mechanisms are arranged around the central driving mechanism, the central driving mechanism comprises a central voice coil connected to the central cone, and a central magnetic driving system for driving the central voice coil, and each outer driving mechanism comprises an outer voice coil connected to the outer cone, an outer damper sleeved on outer voice coil, and an outer magnetic driving system for driving the outer voice coil.

In an embodiment, the frame comprises a frame bottom and an inner flange extending upwards from the frame bottom, and an outer edge of the central cone is fixedly connected to the inner flange.

In an embodiment, the frame further comprises a outer part extending upwards from the frame bottom, the outer part surrounds the inner flange, the outer cone is in a ring shape with an inner edge and an outer edge, the outer edge of the outer cone is fixedly connected to the outer part, and the inner edge of the outer cone is fixedly connected to the inner flange.

In an embodiment, the frame further comprises an frame bottom, an inner flange and an outer part extending upwards from the frame bottom, the outer part surrounds the inner flange, an outer edge of the central cone is fixedly connected to the inner flange, the outer cone is in a ring shape with an inner edge and an outer edge, the outer edge of the outer cone is fixedly connected to the outer part, and the inner edge of the outer cone is fixedly connected to the inner flange.

In an embodiment, the central magnetic driving system and the outer magnetic driving systems are fixedly arranged on the frame bottom, and the central voice coil and the outer voice coils are located between the cone assembly and the frame bottom.

In an embodiment, the central driving mechanism further comprises a central damper sleeved on the central voice coil, and the central damper is embedded in the inner flange.

In an embodiment, a plurality of outer positioning flanges matching the outer damper are provided on the frame bottom, each outer damper is embedded in one of the plurality of outer positioning flanges.

In an embodiment, the central magnetic driving system and the outer magnetic driving systems are fixedly arranged on the frame bottom, and the central voice coil and the outer voice coils are located between the cone assembly and the frame bottom, the central driving mechanism further comprises a central damper sleeved on the central voice coil, and the central damper is embedded in the inner flange, a plurality of outer positioning flanges matching the outer damper are provided on the frame bottom, the outer positioning flanges are located between the inner flange and the outer part, and each outer damper is embedded in one of the plurality of outer positioning flanges.

In an embodiment, the central magnetic driving system and the outer magnetic driving systems are fixedly arranged below the frame bottom, the frame bottom is opened with a central through-hole and a plurality of peripheral through-holes, a lower end of the central voice coil is inserted into a magnetic gap of the central magnetic driving system through the central through hole, and lower ends of the respective outer voice coils are inserted into magnetic gaps of the outer magnetic driving systems through the corresponding peripheral through-holes, the central positioning flange surrounds the central through-hole, and the respective outer positioning flanges surround the corresponding peripheral through-holes.

In an embodiment, the frame bottom is composed of a plurality of connecting ribs, and the connecting ribs are fixedly connected to at least one of the outer part, the inner flange and the outer positioning flanges. That is to say, the frame bottom is a hollow-out structure, and supports the inner flange and the central damper, the central voice coil and so on thereon by the connecting ribs, and supports the outer positioning flanges and the outer dampers, the outer voice coils and so on thereon by the connecting ribs.

In an embodiment, each of the central magnetic driving system and the outer magnetic driving systems comprises a U-yoke having a cavity, and a pad block, a magnetic steel and a magnetic pole core arranged within the U-yoke, an upper end of the U-yoke is fixedly connected to the frame bottom, and a magnetic gap into which the central voice coil or one of the outer voice coils is inserted is formed between the pad block, the magnetic steel and the magnetic pole core and an inner wall of the U-yoke.

In an embodiment, each of the central voice coil and the outer voice coils has a pair of leads, an end portion of each of the leads is connected to an inputting terminal that is capable of being electrically connected to a power amplifier, an outer surface of the outer part is provided with a female connecting port corresponding to the inputting terminal, and the inputting terminal is provided in the female connecting ports. Multi-channel analog or digital audio signals can be input, improving the sound reproduction performance.

In an embodiment, the central cone has a flat plate-shaped main body, and the outer cone has a flat plate-shaped main body.

In an embodiment, when viewing from the top, the central cone is circular, and the outer cone is a ring surrounding the central cone.

In an embodiment, a fixing step is formed on a lower surface of the central cone to connect to the central voice coil; and/or, a plurality of fixing steps are formed on a lower surface of the outer cone to connect to the outer voice coils.

In an embodiment, the outer cone is provided with a plurality of outer dust caps for covering the outer voice coils respectively.

In an embodiment, the plurality of outer driving mechanisms is arranged around the central driving mechanism at equal intervals.

The loudspeaker of the present disclosure has an ingenious and reasonable product structure, the central cone is promoted to sound by inputting an audio signal to the central voice coil to vibrate up and down in the central magnetic driving system, and the outer cone is promoted to sound by inputting multi-channel audio signals respectively to the plurality of outer voice coils to vibrate up and down in the outer magnetic driving systems, the central cone emits a midrange and treble sound, and the outer cone increases and expands the bass performance of the loudspeaker, broadens the frequency bandwidth and directivity of the loudspeaker, and reduces the distortion of the loudspeaker; through the combination of the central voice coil and the plurality of outer voice coils, and through driving the two cones by the central magnetic driving system and the outer magnetic driving systems, the sensitivity of the loudspeaker is increased; by inputting multi-channel audio signals into the central voice coil and the outer voice coils respectively, the central cone and the outer cone are promoted, which can improve the sound reproduction effect of the loudspeaker; the influence of bass and treble superposition on the performance of the traditional coaxial loudspeakers can also be avoided.

BRIEF DESCRIPTION OF DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

REFERENCE NUMBERS

Figure 1:
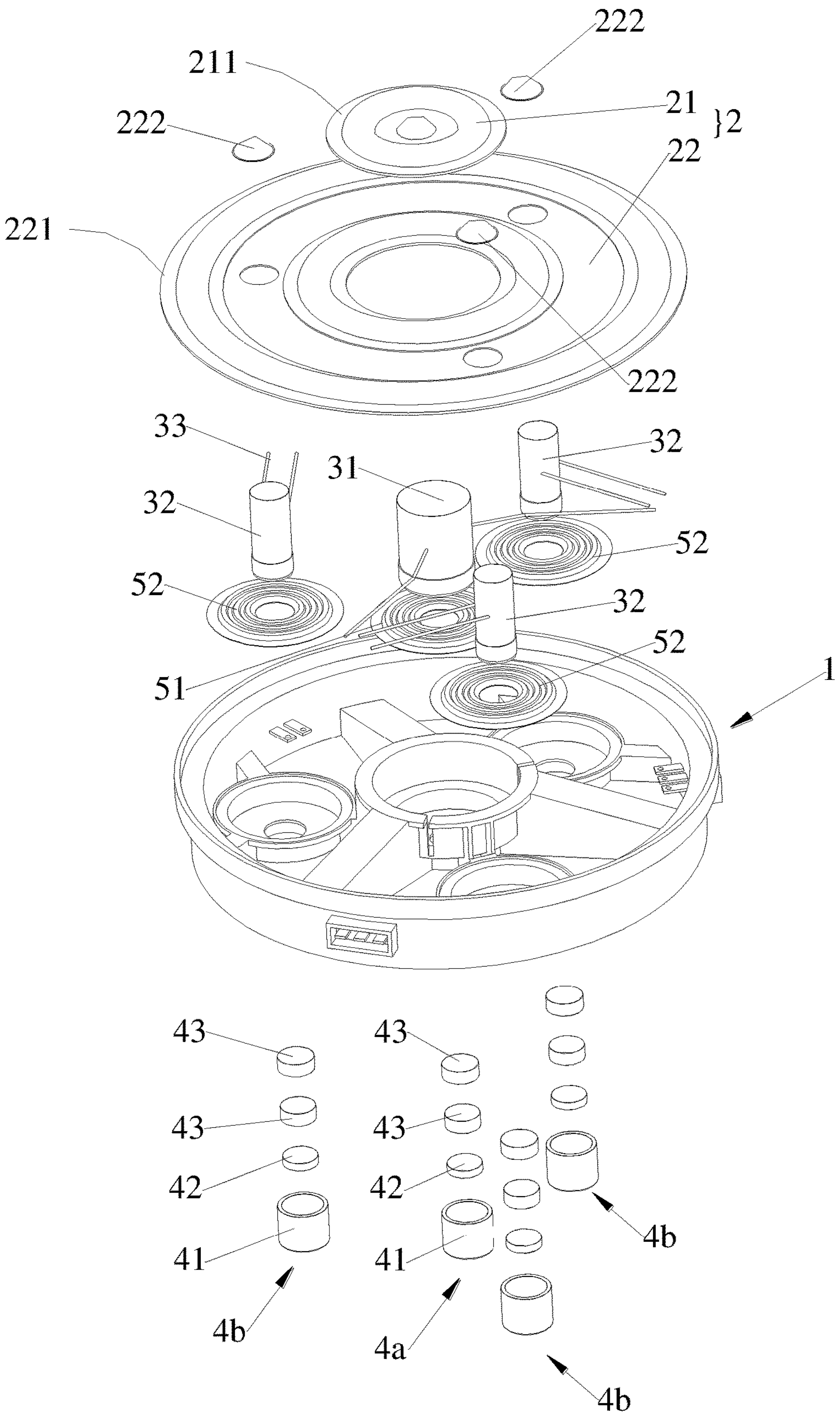
FIG. 1 is a schematic exploded view of a loudspeaker according to an embodiment of the present disclosure.

1—frame; 11—frame bottom; 111—central through-hole; 112—peripheral through-hole; 12—inner flange; 13—outer part; 131—female connecting port; 14—outer positioning flange;

2. cone assembly; 21—central cone; 211—edge ring; 22—outer cone; 221—edge ring; 222 dust cap;

31—central voice coil; 32—outer voice coil; 33—lead; 34—input terminal;

4*a*—central magnetic driving system; 4*b*—outer magnetic driving system; 41—U-yoke; 42 pad block; 43—magnetic steel; 44—magnetic pole core;

51—central damper; 52—outer damper.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

As shown in the specification and the claims, the terms “comprising” and “containing” only indicate that the clearly identified steps and elements are included, and these steps and elements do not constitute an exclusive list, and the method or device may also include other steps or elements. The term “and/or” as used herein includes any combination of one or more of the associated listed items.

In the description of the present application, it should be understood that the orientations or positional relationships indicated by the terms “center”, “periphery”, “upper”, “lower”, “left”, “right”, “vertical”. “horizontal”, “top”, “bottom”, “inner” and “outer”, etc. are based on those shown in the accompanying drawings, are only for the convenience of describing the present application and simplifying the description, rather than indicating or implying that the indicated device(s) or element(s) must have a specific orientation, be constructed and operated in a specific orientation, and therefore should not be construed as a limitation of the present application.

In the description herein, it should be noted, unless otherwise expressly specified and limited, the terms “mount”, “communicate” and “connect” and other terms should be understood in a broad sense, for example, it may be fixedly connected or detachably connected, or integrated; it may be mechanically connected or electrically connected; it can be directly connected or indirectly connected through an intermediate medium, or it can be the internal communication of two elements. For those of ordinary skill in the art, the specific meanings of the above terms in the present disclosure can be understood according to specific situations. On the contrary, when an element is referred to as “directly on” another element, there is no intermediate medium.

This embodiment provides a dual-cone loudspeaker. Referring to FIG. 1 to FIG. 4, the dual-cone loudspeaker comprises a frame 1 and a cone assembly 2 arranged on the frame 1. The cone assembly 2 comprises a central cone 21 and an outer cone 22, the outer cone 22 surrounds the central cone 21, and the central cone 21 and the outer cone 22 are independently arranged on the frame 1 and do not interfere with each other. When viewing from the top, the central cone 21 has a circular outer contour, and the outer cone 22 is in a ring shape with an inner edge and an outer edge; that is, when viewing from the top, the central cone 21 is circular, and the outer cone 22 is a ring surrounding the central cone 21. Preferably, the central cone 21 and the outer cone 22 respectively have flat plate-shaped main bodies, and reinforcing ribs are arranged on the back of the main bodies of the two to improve the working strength and rigidity, which is used to enhance the strength of the voice coil as it pushes the cones. The height of the central cone 21 and the outer cone 22 is lower than the height of the traditional disc-shaped cone, and at the same time, when the central cone 21 and the outer cone 22 adopt the flat-plate shape, the product directivity width is better than that of the loudspeaker with a traditional disc-shaped cone. In another embodiment, the central portion of the central cone 21 may have an upward arched spherical dome, increasing treble frequency extension.

Referring to FIG. 1, the loudspeaker further comprises a central driving mechanism for driving the central cone 21 to vibrate and a plurality of outer driving mechanisms for driving the outer cone 22 to vibrate, and the outer driving mechanisms are arranged around the central driving mechanism. Further, the plurality of outer driving mechanisms is arranged around the central driving mechanism at equal intervals. The central driving mechanism comprises a central voice coil 31 connected to the central cone 21, a central damper 51 tightly sleeved on the central voice coil 31, and a central magnetic driving system 4*a* for driving the central voice coil 31, and each outer driving mechanism comprises an outer voice coil 32 connected to the outer cone 22, an outer damper 52 tightly sleeved on the corresponding outer voice coil 32, and an outer magnetic driving system 4*b* for driving the outer voice coil 32. Preferably, the number of the outer voice coils 32 is three or more, and are arranged in a circle at equal intervals, the center of the circle falls on the midpoint of the central voice coil 31. The central cone 21 is driven by the central voice coil 31 to vibrate and sound, and the central cone 21 undertakes medium and high-frequency sound production. The outer cone 22 is driven by the outer voice coils 32 together to vibrate and sound, and the outer cone 22 undertakes low and medium-frequency sound production. The plurality of outer voice coils 32 can input multi-channel different analog or digital audio signals, which improves the sound reproduction performance of the loudspeaker.

Figure 2:
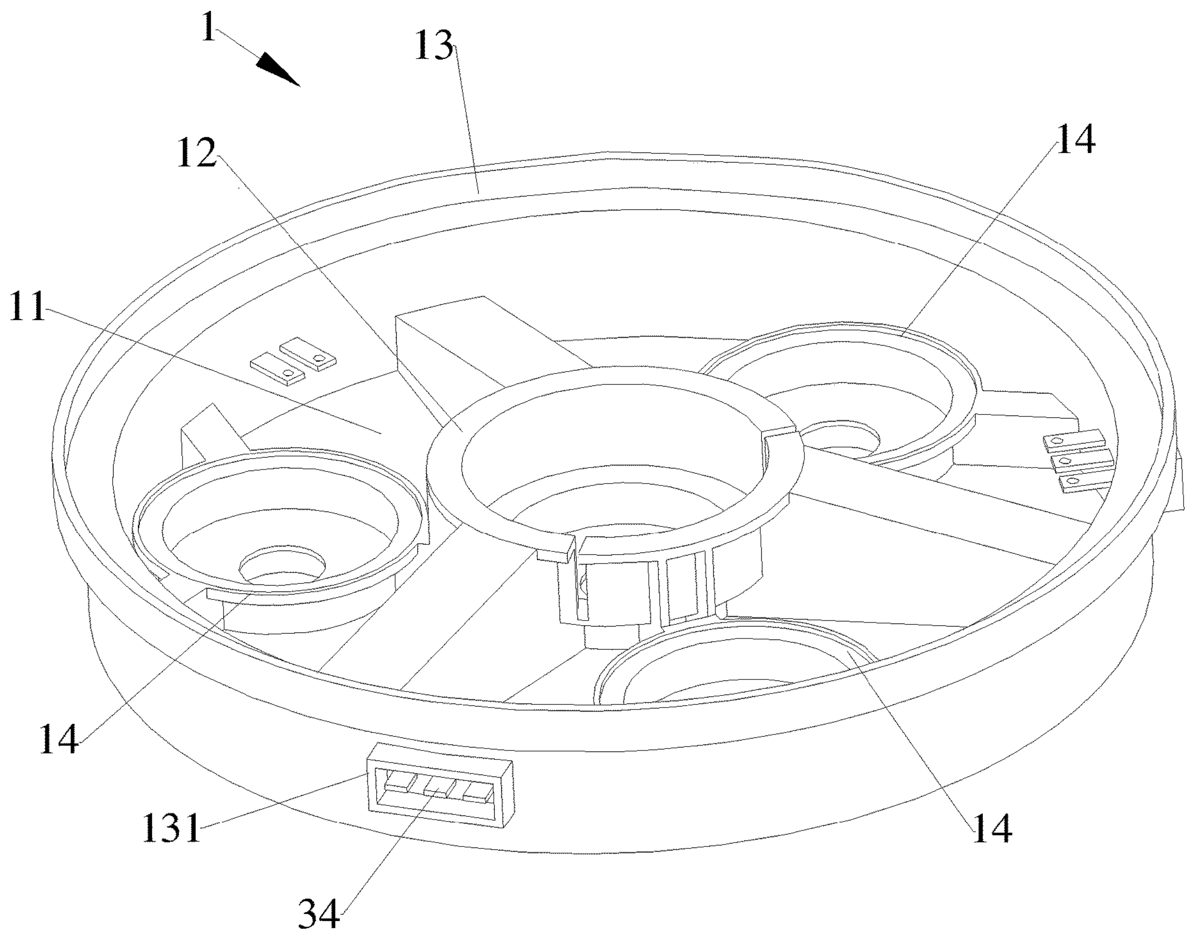
FIG. 2 is a schematic diagram of the frame in FIG. 1.
Figure 3:
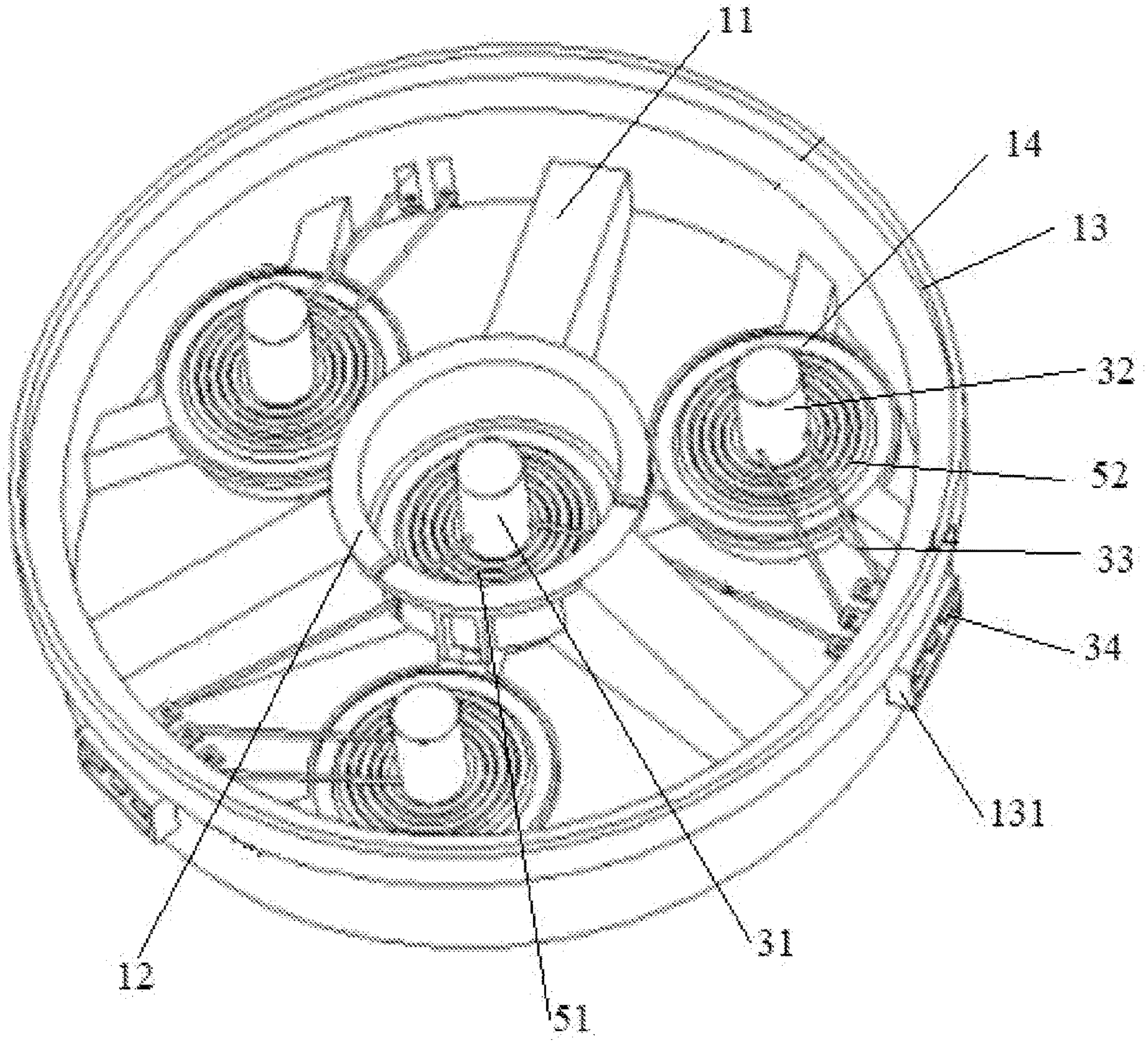
FIG. 3 is a schematic front view of the frame with the voice coil and the damper mounted thereon in FIG. 1.

Referring to FIG. 2 with FIG. 3, the frame 1 comprises a frame bottom 11, an inner flange 12 and an outer part 13 extending upwards from the frame bottom 11, the inner flange 12 is located in the central part of the frame bottom 11, and the outer part 13 extends upwards from the outer edge of the frame bottom 11. The outer edge of the central cone 21 is fixedly connected to the inner flange 12 through an edge ring 211, the inner edge of the outer cone 22 is fixedly connected to the inner flange 12 through a edge ring 211, and the outer edge of the central cone 21 and the inner edge of the outer cone 22 are not connected to each other. A plurality of outer positioning flanges 14 is formed on the frame bottom 11, and the outer positioning flanges 14 are located between the inner flange 12 and the outer part 13. Specifically to this embodiment, the frame bottom 11 is composed of a plurality of connecting ribs, and the connecting ribs are fixedly connected to the outer part 12, the inner flange 13 and at least one of the outer positioning flanges 14. That is to say, the frame bottom 11 is a hollow-out structure, and supports the inner flange 12 and the central damper 51, the central voice coil 31 and so on thereon by the connecting ribs, and supports the outer positioning flanges 14 and the outer dampers 52, the outer voice coils 32 and so on thereon by the connecting ribs.

Referring to FIG. 1, the central magnetic driving system 4*a* and the outer magnetic driving systems 4*b* are fixedly arranged on the frame bottom 11, and the central voice coil 31 and the outer voice coils 32 are located between the cone assembly 2 and the frame bottom 11. Preferably, the central magnetic driving system 4*a* and the outer magnetic driving systems 4*b* are fixedly arranged below the frame bottom 11, the frame bottom 11 has a central through-hole 111 and a plurality of peripheral through-holes 112, a lower end of the central voice coil 31 is inserted into a magnetic gap of the central magnetic driving system 4*a* through the central through hole 111, and lower ends of the respective outer voice coils 32 are inserted into magnetic gaps of the outer magnetic driving systems 4*b* through the corresponding peripheral through-holes 112. Wherein, the central through-hole is formed by the inner flange 12, and the respective outer positioning flanges 14 form the corresponding peripheral through-holes 112.

Referring to FIG. 3, a central damper 51 is tightly sleeved on the central voice coil 31, the central damper 51 is embedded in the inner flange 12, and the inside surface of the central damper 51 is glued to the central voice coil 31 and the outside surface thereof is tightly fitted with the inner wall of the inner flange 12, preventing the central voice coil 31 and the central cone 21 from swaying except in the vibration direction during vibration. An outer damper 52 is tightly sleeved on each of the outer voice coils 32, the outer dampers 52 are embedded in the corresponding outer positioning flanges 14, and the inside surfaces of the outer dampers 52 are glued to the outer voice coils 32 and the outside surfaces thereof are tightly fitted with the inner walls of the outer positioning flanges 14, preventing the outer voice coils 32 and the outer cone 22 from swaying except in the vibration direction during vibration. When the above-mentioned central cone 21 is a cone with a spherical dome, it may not provide the central damper 51.

Referring to FIG. 1, each of the central magnetic driving system 4*a* and the outer magnetic driving systems 4*b* comprises a U-yoke 41 having a cavity, and a pad block 42, a magnetic steel 43 and a magnetic pole core 44 arranged within the U-yoke 41, the pad block 42 is specifically neodymium pad block, and the magnetic steel 43 is a neodymium magnetic steel. An upper end of the U-yoke 41 is fixedly connected to the frame bottom 11, and a magnetic gap into which the central voice coil 31 or the outer voice coils 32 are inserted is formed between the outside surfaces of the three, namely the pad block 42, the magnetic steel 43 and the magnetic pole core 44, and an inner side wall of the U-yoke 41. The above-mentioned central through-hole 111 is opened at the center of the frame bottom 11, an upper end of the U-yoke 41 of the central magnetic driving system 4*a* is fixedly arranged within the central through-hole 111, the U-yoke 41 is mounted with the pad block 42, the magnetic steel 43 and the magnetic pole core 44 from bottom to top therein, the lower surface of the magnetic pole core 44 is tightly fitted with the upper surface of the neodymium magnetic steel 43, the lower surface of the neodymium magnetic steel 43 is tightly fitted with the upper surface of the pad block 42, the lower surface of the pad block 42 is tightly fitted with the upper surface of the bottom of the U-yoke 41, and there is a gap between the outside surfaces of the three, namely the pad block 42, the magnetic steel 43 and the magnetic pole core 44, and the inner side surface of the U-yoke 41, thus forming a magnetic gap into which the central voice coil 31 is inserted. The above-mentioned plurality of peripheral through-holes 112 is distributed evenly around the central through-hole 111, upper ends of the U-yokes 41 of the respective outer magnetic driving systems 4*b* are fixedly arranged within the corresponding peripheral through-holes 112, the U-yokes 41 are mounted with the pad blocks 42, the magnetic steels 43 and the magnetic pole cores 44 from bottom to top therein, the lower surfaces of the magnetic pole cores 44 are tightly fitted with the upper surfaces of the neodymium magnetic steels 43, the lower surfaces of the neodymium magnetic steels 43 are tightly fitted with the upper surfaces of the pad blocks 42, the lower surfaces of the pad blocks 42 are tightly fitted with the upper surfaces of the bottoms of the U-yokes 41, and there is a gap between the outside surfaces of the three, namely the pad blocks 42, the magnetic steels 43 and the magnetic pole cores 44, and the inner side surfaces of the U-yokes 41, thus forming a magnetic gap into which the outer voice coils 32 are inserted. Preferably, the frame 1 is formed by plastic injection molding, and the U-yokes 41 are embedded within the frame 1 during the injection molding process, which improves the combination accuracy. In this embodiment, the above magnetic steel magnetic driving system is also called the internal magnetic system. In addition, a ferrite structure magnetic driving system (i.e., an external magnetic system comprising a T-yoke) or a magnetic steel and ferrite mixed magnetic driving system can also be used.

Figure 4:
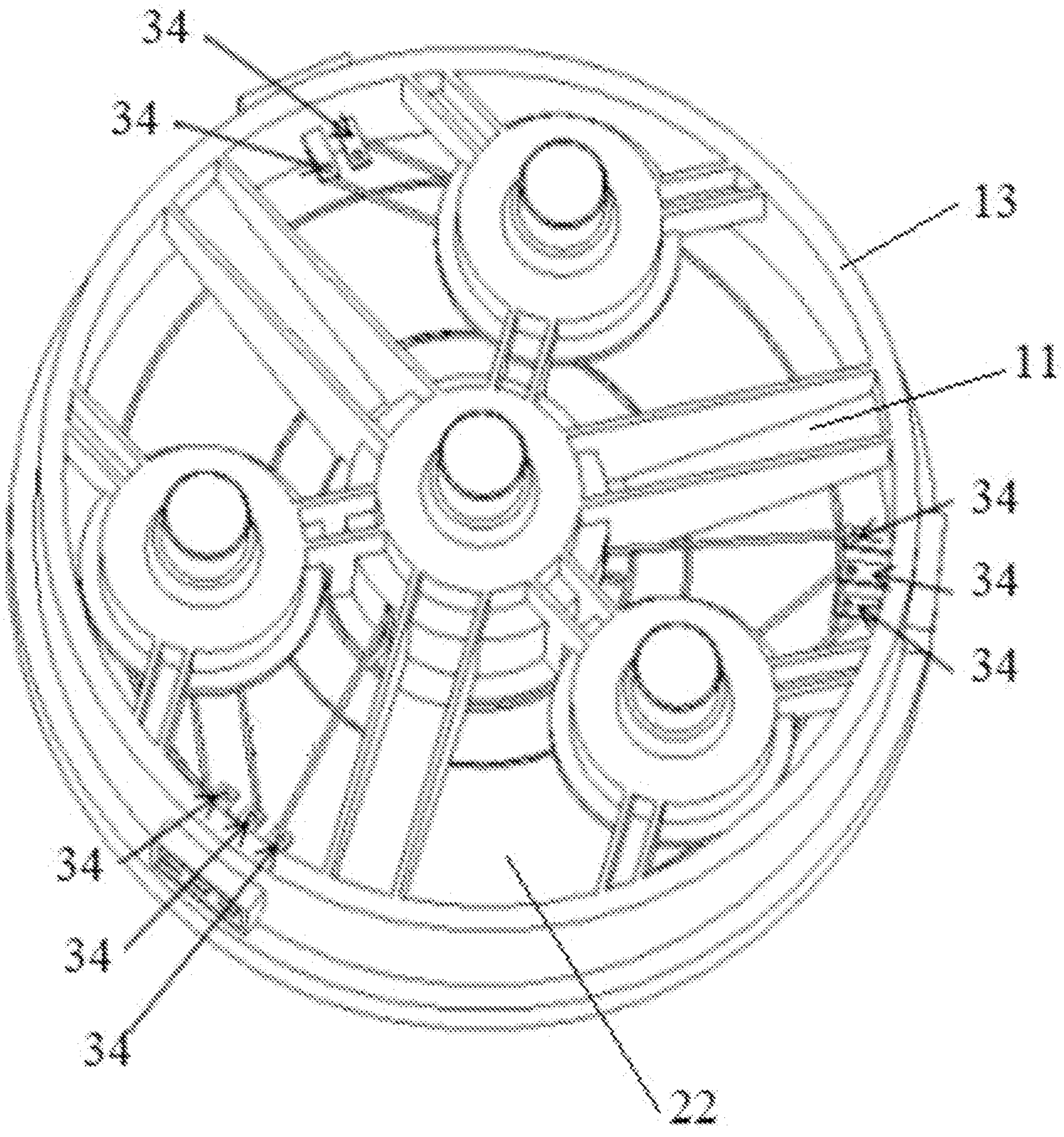
FIG. 4 is a schematic back view of the frame with the voice coil mounted thereon in FIG. 1.

As shown in FIG. 2 to FIG. 4, a plurality of female connecting ports 131 is provided on the outer surface of the outer part 13, a plurality of input terminals 34 is integrated within each female connecting port 131, and can be electrically connected to external components (such as a power amplifier) through the female connecting port 131. Each of the central voice coil 31 and the respective outer voice coils 32 has a pair of leads, an end portion of each lead 33 is connected with one above-mentioned input terminal 34 that is embedded on the outer part 13. Specifically, each voice coil is provided with 1 group of positive and negative leads 33, and each group of leads 33 are connected to two input terminals 34 on the outer part 13. When it is necessary to connect the loudspeaker to a power amplifier, a male connector connected to the power amplifier can be inserted into a female connection port 131, to conduct the input terminals 34 therein, and to achieve the transmission of audio signals. By inputting multiple analog audio signals or multiple digital audio signals to the central voice coil 31 and the respective outer voice coils 32 by the plurality of input terminals 34, the sound reproduction performance of the loudspeaker is improved.

A fixing step is formed on a lower surface of the central cone 21 to connect to the central voice coil 31, and the upper end of the central voice coil 31 is tightly fitted with the fixing step. Fixing steps are formed on a lower surface of the outer cone 22 to connect to the outer voice coils 32, and the upper ends of the outer voice coils 32 are tightly fitted with the fixing steps. The outer cone is provided with a plurality of outer dust caps 22 for covering the outer voice coils respectively.

The material of the above-mentioned frame 1 is plastic or metal material. The central cone 21 and the outer cones 22 are made of different materials, such as plastic (PP), cloth (silks), metal or alloy (aluminum alloy), and can be a film-like material. The edge rings 221 are made of the same material as the outer cones 22, or sponge, rubber, cloth or combinations thereof. They have the advantages of light weight, good damping elasticity and rigidity, high and low temperature resistance, waterproof and mold-proof.

The loudspeaker of this embodiment has the following characteristics: by providing the central cone 21 with a spherical dome in the center of the frame 1, providing the step for fixing the voice coil at the lower end of the central cone 21, and fixing the central voice coil 31 on the fixing step of the central cone 21, a vibration system for the midrange and treble sound production is formed; an outer cone 22 with a main body of an overall flat shape is provided at the periphery of the central cone 21, the inner side edge and outer side end of the outer cone 22 are provided with yoke rings, the bottom of the outer cone 22 are evenly provided with more than three steps for fixing the voice coils to fix the three outer voice coils on the steps of the outer cone 22, and to form a vibration system for bass and midrange sound production, thus forming a dual-cone multi-magnetic circuit loudspeaker without a damper. Such a loudspeaker adopts a dual-cone, multi-magnetic circuit and multi-voice coil drive structure, and when compared with the traditional loudspeaker without a damper, dual cones is used, that is, the central cone 21 undertakes the midrange and treble sound production, the outer cone 22 undertakes the bass and midrange sound production, the combination of dual cones is conducive to improving the sound reproduction clarity of the loudspeaker, and the bass and directional width of the loudspeaker is also better than that of the loudspeakers with traditional cones; by using a single-channel signal input to drive the central voice coil 31 to move up and down in the magnetic circuit of the U-yoke 41, and by using a multi-channel signal input to drive the plurality of voice coils to move up and down in the magnetic circuits of the plurality of U-yokes 41, the center cone 21 and the flat plate-shaped outer cone 22 are pushed to sound, the sensitivity of the loudspeaker may be increased, and the distortion of the loudspeaker may be reduced. For this loudspeaker, multi-channel audio signal inputs can be used to drive the loudspeaker to sound, and through inputting multi-channel digital audio signals to the loudspeaker, its sound reproduction quality, directivity, frequency width and the like will be better than the traditional loudspeaker. By using the multi-voice coil and flat-cone loudspeaker structure, the height of the loudspeaker is greatly reduced compared with the height of the traditional loudspeaker. It can also change the influence of bass and treble superposition on the performance of the traditional coaxial loudspeakers.

The loudspeaker has an ingenious and reasonable product structure, and the central cone 21 (plane or spherical) is promoted to sound by inputting an audio signal to the central voice coil 31 to vibrate up and down in the central magnetic driving system; the outer cone 22 is promoted to sound by inputting multi-channel audio signals to the plurality of outer voice coils 32 to vibrate up and down in the outer magnetic driving systems. The central cone 21 adopts a plane shape or a spherical dome at the center to emit midrange and treble sound, and the outer cone 22 of a plane shape increase and expand the bass performance of the loudspeaker, broadens the frequency bandwidth and directivity of the loudspeaker, and reduces the distortion of the loudspeaker; through the combination of the central voice coil 31 and the plurality of outer voice coils 32, and through driving the dual cones by the central magnetic driving system **4*a* and the outer magnetic driving systems 4*b*, the sensitivity of the loudspeaker is increased; the central cone 21 adopts a plane or spherical structure, and the outer cone adopts a flat-plate shape and inner and outer yoke rings, so that the height of the cones are reduced, thus reducing the height of the product; by inputting multi-channel audio signals into the central voice coil 31 and the outer voice coils respectively, the central cone 21** and the outer cones are promoted, which can improve the sound reproduction effect of the loudspeaker. At the same time, the product has a compact structure, effectively utilizes space, and has a small overall volume that can be used as a small loudspeaker, making assembly and use more convenient.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure.

What is claimed is:

1. A dual-cone loudspeaker comprising:

a frame;

a cone assembly arranged on the frame, comprising a central cone and an outer cone;

a central drive mechanism for driving the central cone to vibrate; and a plurality of outer driving mechanisms for driving the outer cone to vibrate;

wherein, the outer driving mechanisms are arranged around the central drive mechanism, the central drive mechanism comprises a central voice coil connected to the central cone, and a central magnetic driving system for driving the central voice coil, and each of the plurality of outer driving mechanisms comprises an outer voice coil connected to the outer cone, an outer damper sleeved on the outer voice coil, and an outer magnetic driving system for driving the outer voice coil;

wherein the frame comprises a frame bottom, an inner flange and an outer part extending upwards from the frame bottom, the outer part surrounds the inner flange, an outer edge of the central cone is fixedly connected to the inner flange, the outer cone is in a ring shape with an inner edge and an outer edge, the outer edge of the outer cone is fixedly connected to the outer part, and the inner edge of the outer cone is fixedly connected to the inner flange.

2. The loudspeaker according to claim 1, wherein the central magnetic driving system and the outer magnetic driving systems are fixedly arranged on the frame bottom, and the central voice coil and the outer voice coils are located between the cone assembly and the frame bottom.

3. The loudspeaker according to claim 2, wherein the central drive mechanism further comprises a central damper sleeved on the central voice coil, and the central damper is embedded in the inner flange.

4. The loudspeaker according to claim 3, wherein a plurality of outer positioning flanges matching the outer damper are provided on the frame bottom, each outer damper is embedded in one of the plurality of outer positioning flanges.

5. The loudspeaker according to claim 1, wherein the central magnetic driving system and the outer magnetic driving systems are fixedly arranged on the frame bottom, and the central voice coil and the outer voice coils are located between the cone assembly and the frame bottom, the central drive mechanism further comprises a central damper sleeved on the central voice coil, and the central damper is embedded in the inner flange, a plurality of outer positioning flanges matching the outer damper are provided on the frame bottom, the outer positioning flanges are located between the inner flange and the outer part, and each outer damper is embedded in one of the plurality of outer positioning flanges.

6. The loudspeaker according to claim 5, wherein the frame bottom is composed of a plurality of connecting ribs, and the connecting ribs are fixedly connected to at least one of the outer part, the inner flange and the outer positioning flanges.

7. The loudspeaker according to claim 5, wherein the central magnetic driving system and the outer magnetic driving systems are fixedly arranged below the frame bottom, the frame bottom is opened with a central through-hole and a plurality of peripheral through-holes, a lower end of the central voice coil is inserted into a magnetic gap of the central magnetic driving system through the central through hole, and a lower end of one of the outer voice coils are inserted into a magnetic gap of one of the outer magnetic driving systems through one of the peripheral through-holes, the central positioning flange surrounds the central through-hole, and each of the outer positioning flanges surrounds one of the peripheral through-holes.

8. The loudspeaker according to claim 1, wherein each of the central magnetic driving system and the outer magnetic driving systems comprises a U-yoke having a cavity, and a pad block, a magnetic steel and a magnetic pole core arranged within the U-yoke, an upper end of the U-yoke is fixedly connected to the frame bottom, and a magnetic gap into which the central voice coil or one of the outer voice coils is inserted is formed between the pad block, the magnetic steel and the magnetic pole core and an inner wall of the U-yoke.

9. The loudspeaker according to claim 1, wherein each of the central voice coil and the outer voice coils has a pair of leads, an end portion of each of the leads is connected to an inputting terminal that is capable of being electrically connected to a power amplifier, an outer surface of the outer part is provided with a female connecting port corresponding to the inputting terminal, and the inputting terminal is provided in the female connecting ports.

10. The loudspeaker according to claim 1, wherein the central cone has a flat plate-shaped main body, and the outer cone has a flat plate-shaped main body.

11. The loudspeaker according to claim 1, wherein, when viewing from the top, the central cone is circular, and the outer cone is a ring surrounding the central cone.

12. A dual-cone loudspeaker comprising:

a frame;

a cone assembly arranged on the frame, comprising a central cone and an outer cone;

a central drive mechanism for driving the central cone to vibrate; and a plurality of outer driving mechanisms for driving the outer cone to vibrate;

wherein, the outer driving mechanisms are arranged around the central drive mechanism, the central drive mechanism comprises a central voice coil connected to the central cone, and a central magnetic driving system for driving the central voice coil, and each of the plurality of outer driving mechanisms comprises an outer voice coil connected to the outer cone, an outer damper sleeved on the outer voice coil, and an outer magnetic driving system for driving the outer voice coil;

wherein a fixing step is formed on a lower surface of the central cone to connect to the central voice coil; and/or, a plurality of fixing steps are formed on a lower surface of the outer cone to connect to the outer voice coils.

13. A dual-cone loudspeaker comprising:

a frame, a cone assembly arranged on the frame, comprising a central cone and an outer cone;

a central drive mechanism for driving the central cone to vibrate; and a plurality of outer driving mechanisms for driving the outer cone to vibrate;

wherein, the outer driving mechanisms are arranged around the central drive mechanism, the central drive mechanism comprises a central voice coil connected to the central cone, and a central magnetic driving system for driving the central voice coil, and each of the plurality of outer driving mechanisms comprises an outer voice coil connected to the outer cone, an outer damper sleeved on the outer voice coil, and an outer magnetic driving system for driving the outer voice coil;

wherein the outer cone is provided with a plurality of outer dust caps for covering the outer voice coils respectively.

* * * * *